United States Patent
Li et al.

(10) Patent No.: US 11,223,426 B2
(45) Date of Patent: Jan. 11, 2022

(54) METHOD FOR CORRECTING PHASE JUMP CAUSED BY POLARIZATION-INDUCED FADING IN OPTICAL FIBER PHASE DEMODULATION

(71) Applicant: Wuhan University of Technology, Hubei (CN)

(72) Inventors: Zhengying Li, Hubei (CN); Minlang Fan, Hubei (CN); Honghai Wang, Hubei (CN); Jun Wu, Hubei (CN); Jiaqi Wang, Hubei (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 17/180,735

(22) Filed: Feb. 20, 2021

(65) Prior Publication Data

US 2021/0384987 A1 Dec. 9, 2021

Related U.S. Application Data

(63) Continuation of application No. PCT/CN2021/070278, filed on Jan. 5, 2021.

(30) Foreign Application Priority Data

Jun. 9, 2020 (CN) .......................... 202010526947.1

(51) Int. Cl.
*H04B 10/06* (2006.01)
*H04B 10/67* (2013.01)
(Continued)

(52) U.S. Cl.
CPC ........... *H04B 10/676* (2013.01); *G06F 17/16* (2013.01); *G06N 7/005* (2013.01); *H04B 10/2507* (2013.01); *H04B 10/697* (2013.01)

(58) Field of Classification Search
CPC .............. H04B 10/676; H04B 10/2507; H04B 10/697; H04B 10/6971; H04B 10/69; H04B 10/6165; H04B 10/548; H04B 10/532; H04B 10/5161; H04B 10/40; H04J 14/06; G06F 17/16; G06N 7/005
(Continued)

(56) References Cited

U.S. PATENT DOCUMENTS

| | | | | |
|---|---|---|---|---|
| 5,355,243 A * | 10/1994 | King | ...................... | H04B 10/61 398/203 |
| 8,543,011 B2 * | 9/2013 | Elbers | ................ | H04B 10/6971 398/203 |
| 2008/0075472 A1 * | 3/2008 | Liu | .................... | H04B 10/5161 398/202 |

* cited by examiner

*Primary Examiner* — Hanh Phan

(57) ABSTRACT

A method for correcting a phase jump caused by polarization-induced fading in optical fiber phase demodulation, including the steps of: 1, selecting a demodulated phase in the case of non-depolarization as historical sample data; 2, determining an autoregressive coefficient and a moving average coefficient of the autoregressive moving average model for the demodulated phase; 3, establishing a Kalman prediction model for the demodulated phase, and deriving recursive equations of the Kalman prediction model for the demodulated phase; and 4, judging whether a jump point exists in the actual demodulated phase, determining polarization states of lights if the jump point exists, and correcting the jump point when the polarization states of the lights are in polarization orthogonality by replacing the actual demodulated phase with a predicted phase value. The disclosure ensures the correctness of subsequent vibration-based signal processing.

9 Claims, 2 Drawing Sheets

(51) Int. Cl.
*G06F 17/16* (2006.01)
*H04B 10/69* (2013.01)
*H04B 10/2507* (2013.01)
*G06N 7/00* (2006.01)

(58) Field of Classification Search
USPC ....... 398/202, 208, 209, 211, 212, 213, 214,
398/158, 159, 161, 65, 152, 183, 188,
398/184, 135, 136, 25
See application file for complete search history.

METHOD FOR CORRECTING PHASE JUMP CAUSED BY POLARIZATION-INDUCED FADING IN OPTICAL FIBER PHASE DEMODULATION

CROSS-REFERENCE TO RELATED APPLICATIONS

The application claims priority to Chinese patent application No. 202010526947.1, filed on Jun. 9, 2020, the entire contents of which are incorporated herein by reference.

TECHNICAL FIELD

The disclosure relates to the technical field of optical fiber sensing, and more particularly, to a method for correcting a phase jump caused by polarization-induced fading in optical fiber phase demodulation.

BACKGROUND

Vibration is one of the most common phenomena in nature and can be applied in monitoring structural health, early warning of disasters and abnormalities, and the like. Vibration detection is a major research subject and application field in distributed optical fiber sensing technologies.

An optical fiber vibration monitoring system restores the vibration information in an environment by demodulating the phase change of the optical pulse transmitted in an optical fiber. An arctangent demodulation method based on a 3×3 fiber coupler is one of the primary methods of fiber vibration demodulation. In the method, sine and cosine variables in an arctangent operation are established by utilizing the characteristic of the 3×3 optical fiber coupler that a phase difference of 120° exists between each two of the optical signals output by three terminals, and the phase information in the optical signals is demodulated through the arctangent operation. The value range of the arctangent operation is $(-\pi/2, \pi/2)$ and expanded to $(-\pi, \pi)$ according to the signs of the sine and cosine variables involved in the operation, so that the phase value representing vibration demodulated by the arctangent operation is limited within $(-\pi, \pi)$, and a phase deconvolution algorithm is necessary to restore the real phase change caused by vibration signals, i.e., by adding or subtracting a compensation of $2\pi$ to or from the phase value at the next moment when the difference between two adjacent demodulated phase values is greater than $\pi$. In practical engineering, the distributed optical fiber vibration sensing technology has to cover a long range, transmission of detecting light pulses in the optical fiber is more likely to change the visibility of interference signals output by the interferometer due to random polarization state changes resulted from optical fiber bending, stress and the like, and when the polarization states of the two interference lights are orthogonal, the visibility of the interference signals output by the interferometer is zero, namely, depolarized, with polarization-induced signal fading. When the visibility of the interference signal is low, the sine and cosine components established according to the phase difference characteristic of the optical signals output by three terminals of the 3×3 optical fiber coupler approach to zero; moreover, the arctangent operation is distorted under the influence of electric noise and optical noise, consequently, wrong phase compensation exists in the phase signals restored through the phase deconvolution algorithm, and thus step jump exists in the final demodulated vibration information, which seriously affected the application of the optical fiber vibration monitoring system in practical engineering.

SUMMARY

It is an object of the disclosure to solve the above technical problem by providing a method for correcting a phase jump caused by polarization-induced fading in optical fiber phase demodulation. In the disclosure, a prediction model for the demodulated phase is established by utilizing the demodulated phase without jumps in history, and the predicted phase value and the actual demodulated phase value are compared and analyzed to judge whether a jump point exists or not and then correct the jump point. In this way, the correctness of subsequent vibration-based signal processing is guaranteed.

For this purpose, the present disclosure provides a method for correcting a phase jump caused by polarization-induced fading in optical fiber phase demodulation, comprising the steps of:

step 1: analyzing optical signals output by three terminals of a 3×3 optical fiber coupler in a Mach Zender interferometer, and selecting a demodulated phase in a case of non-depolarization as historical sample data;

step 2: using the historical sample sequence selected in step 1, building an autoregressive moving average model for the demodulated phase through time sequence analyses, determining orders of the autoregressive moving average model for the demodulated phase through Akaike Information Criterion or Bayesian Information Criterion, and determining an autoregressive coefficient and a moving average coefficient of the autoregressive moving average model for the demodulated phase through a least-square estimation;

step 3: representing a Kalman state vector with the demodulated phase, initializing parameters such as a Kalman state transition matrix, a system noise vector, and a prediction output matrix with the autoregressive moving average model for the demodulated phase obtained in step 2, establishing a Kalman prediction model for the demodulated phase, and deriving recursive equations for the Kalman prediction model for the demodulated phase;

step 4: performing real-time prediction on the demodulated phase with the established Kalman prediction model for the demodulated phase, subtracting a predicted phase from an actual phase demodulated with an arctangent algorithm and a phase deconvolution algorithm to judge whether a jump point exists in the actual demodulated phase, determining a polarization state of light if the jump point exists, and correcting the jump point when the polarization state of the light is determined to be depolarized by replacing the actual demodulated phase value with the predicted phase value.

Herein, an established ARMA (autoregressive moving average) model for the demodulated phase is used for initializing the state equation and the observation equation of the Kalman demodulated phase, which effectively addresses the difficulties in determining parameters of the Kalman prediction model for the demodulated phase; the Kalman prediction model for the demodulated phase initialized by the ARMA model for the demodulated model has higher accuracy and stability than conventional Kalman predictions. Real-time prediction is performed on the subsequent phase through the Kalman prediction model for the demodulated phase, the predicted phase value and the actual demodulated phase value are compared and analyzed to judge whether the actual demodulated phase has step jumps or not, and then correct the jump point to eliminate the jump point in the demodulated phase;

DETAILED DESCRIPTION OF THE EMBODIMENTS

The present disclosure will now be described in further detail with reference to the accompanying drawings and examples.

Figure 1:
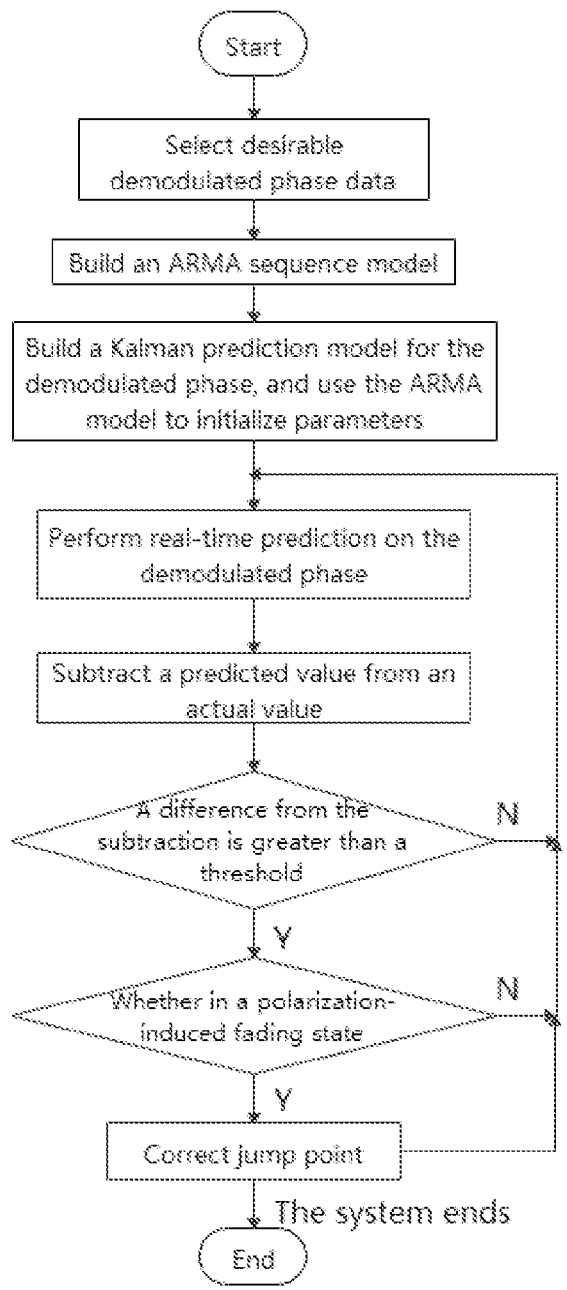
FIG. 1 is a flow diagram of the disclosure.
Figure 2:
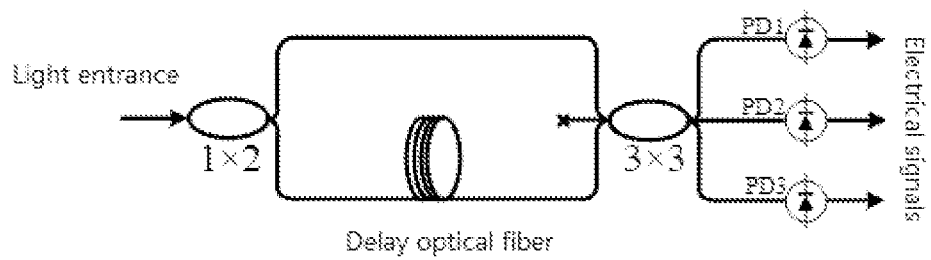
FIG. 2 is a structural diagram of a Mach Zender interferometer in accordance with the disclosure.

A method for correcting a phase jump caused by polarization-induced fading in optical fiber phase demodulation, as shown in FIGS. 1 and 2, including the steps of:

step 1: analyzing optical signals output by three terminals of a 3×3 optical fiber coupler in a Mach Zender interferometer, and selecting a demodulated phase in a case of non-depolarization as historical sample data;

step 2: using the historical sample sequence selected in step 1, building an autoregressive moving average model for the demodulated phase through time sequence analyses, determining orders of the autoregressive moving average model for the demodulated phase through Akaike Information Criterion or Bayesian Information Criterion, and determining an autoregressive coefficient and a moving average coefficient of the autoregressive moving average model for the demodulated phase through a least-square estimation;

step 3: representing a Kalman state vector with the demodulated phase, initializing parameters such as a Kalman state transition matrix, a system noise vector, and a prediction output matrix with the autoregressive moving average model for the demodulated phase obtained in step 2, establishing a Kalman prediction model for the demodulated phase, and deriving recursive equations for the Kalman prediction model for the demodulated phase, where Kalman prediction effects are applied to optical fiber vibration sensing herein, and a state vector and parameters of Kalman are determined by a demodulated phase value to establish the Kalman prediction model for the demodulated phase;

step 4: performing real-time prediction on the demodulated phase with the established Kalman prediction model for the demodulated phase, subtracting a predicted phase from an actual phase demodulated with an arctangent algorithm and a phase deconvolution algorithm to judge whether a jump point exists in the actual demodulated phase, determining a polarization state of light if the jump point exists, and correcting the jump point when the polarization state of the light is determined to be depolarized by replacing the actual demodulated phase value with the predicted phase value.

In step 1 of the above technical solution, in the case of non-depolarization, a phase difference of 120° exists in the optical signals output by three terminals of the 3×3 optical fiber coupler, a photoelectric detector detects that the optical signals output by three terminals of the 3×3 optical fiber coupler do not tend to be equal, and the demodulated phase in the case of non-depolarization is selected as the historical sample data $\{\varphi(k)\}$ through a judgment of an amplitude of the optical signals output by three terminals of the 3×3 optical fiber coupler.

In step 2 of the above technical solution, the autoregressive moving average model for the demodulated phase is built through the historical sample data $\{\varphi(k)\}$, and the demodulated phase at a current moment of the autoregressive moving average model for the demodulated phase and the demodulated phase at a historical moment satisfy the following relational equation:

$$\varphi(k+1) = a_1\varphi(k) + a_2\varphi(k-1) + \ldots + a_p\varphi(k-p+1)$$
$$e(k+1) + \theta_1 e(k) + \ldots + \theta_q e(k-q+1) \quad (1)$$

where $\varphi(k+1)$, $\varphi(k)$, $\varphi(k-1)$, ..., $\varphi(k-q+1)$ represent demodulated phase values at moments k+1, k, k−1, ..., k−p+1, respectively; e(k+1), e(k), ..., e(k−q+1) is a white noise residual error sequence, representing a residual error between the current moment and the historical moment, $a_n$(n=1, 2, ..., p) is an autoregressive coefficient, p is a regression order, $\theta_m$(m=1, 2, ..., q) is a moving average coefficient, and q is a moving average order;

the orders p and q of the autoregressive moving average model for the demodulated phase are determined through Akaike Information Criterion or Bayes Information Criterion, and the autoregressive coefficient $a_n$ and the moving average coefficient $\theta_m$ of the autoregressive moving average model for the demodulated phase are determined through the selected historical sample sequence $\{\varphi(k)\}$ of the demodulated phase in conjunction with a least-square estimation, so that a specific form of the autoregressive moving average model for the demodulated phase is determined.

The Kalman prediction model for the demodulated phase established in step 3 of the above technical solution is expressed as:

$$\begin{cases} \Phi(k+1) = A(k+1, k)\Phi(k) + w(k) \\ Z(k+1) = H(k+1)\Phi(k+1) + v(k+1) \end{cases} \quad (2)$$

where $\Phi(k)$ is a state vector at moment k, $\Phi(k+1)$ is a state vector at moment k+1, Z(k+1) is a measurement vector at moment k+1, w(k) is a system noise vector at moment k, v(k+1) is a measurement noise vector at moment k+1, A(k+1, k) is a state transition matrix from moment k to moment k+1, and H(k+1) is a prediction output matrix at moment k+1;

the Kalman state vector $\Phi(k)$ represented by the demodulated phase $\varphi(k)$ is as follows:

let:

$$\Phi(k) = [\varphi_1(k)\varphi_2(k) \ldots \varphi_p(k)]^T \quad (3)$$

where $\Phi(k)$ represents the Kalman state vector built by the demodulated phase, and T represents transposition of a matrix;

the autoregressive moving average model for the demodulated phase is further introduced into the Kalman prediction model for the demodulated phase to obtain a state equation of the Kalman prediction model for the demodulated phase, which is as follows:

let: $e_1(k)=e(k), e_2(k)=e(k-1), \ldots, e_{q+1}(k)=e(k-q+1)$ $$\Phi(k+1) = \begin{bmatrix} a_1 & a_2 & \cdots & a_{p-1} & a_p \\ 1 & 0 & \cdots & 0 & 0 \\ 0 & 1 & \cdots & 0 & 0 \\ \vdots & \vdots & \ddots & \vdots & 0 \\ 0 & 0 & \cdots & 1 & 0 \end{bmatrix} - \quad (4)$$

$$\Phi(k) + \begin{bmatrix} 1 \\ 0 \\ 0 \\ \vdots \\ 0 \end{bmatrix} e(k+1) + \begin{bmatrix} -\theta_1 \\ 0 \\ 0 \\ \vdots \\ 0 \end{bmatrix} e_1(k) + \begin{bmatrix} -\theta_2 \\ 0 \\ 0 \\ \vdots \\ 0 \end{bmatrix} e_2(k) +$$

$$\cdots + \begin{bmatrix} -\theta_q \\ 0 \\ 0 \\ \vdots \\ 0 \end{bmatrix} e_{q+1}(k)$$

where $\Phi(k+1)$, $\Phi(k)$ are phase state vectors at moments $k+1$, $k$, $e(k+1)$, $e(k)$, $e(k-1)$, ..., $e(k-q+1)$ is a residual white noise sequence of an autoregressive moving average sequence for the demodulated phase, and $\theta_1, \theta_2, \ldots, \theta_q$ are moving average coefficients;

an observation equation of the Kalman prediction model for the demodulated phase is obtained as follows:

$$Z(k+1) = [1\ 0\ \ldots\ 0]\Phi(k+1) \quad (5)$$

specific forms of the state transition matrix $A(k+1, k)$ and the prediction output matrix $H(k+1)$ are determined by comparing Equation (2) with Equations (4) and (5), and recursive equations for the Kalman prediction model for the demodulated phase are further derived through the state equation (4) and the observation equation (5) of the Kalman prediction model for the demodulated phase, as follows:

$$\hat{\Phi}(k+1|k+1) = A(k+1,k)\Phi(k|k) + K(k+1)[Z(k+1) - H(k+1)A(k+1,k)\Phi(k|k)] \quad (6)$$

$$K(k+1) = P(k+1|k)H^T(k+1)\cdot[H(k+1)P(k+1|k)H^T(k+1)]^{-1} \quad (7)$$

$$P(k+1|k) = A(k+1,k)P(k|k)A^T(k+1,k) + Q(k) \quad (8)$$

$$P(k+1|k+1) = [I - K(k+1)H(k+1)]P(k+1|k) \quad (9)$$

where $\hat{\Phi}(k+1|k+1)$ represents an estimated value of the state vector $\Phi(k+1)$ at moment $k+1$; $K(k+1)$ is a Kalman gain matrix at moment $k+1$, $\Phi(k|k)$ represents an estimate of the state vector at moment $k$, $Z(k+1)$ represents an observation vector in Equation (5), $P(k+1|k)$ represents a single-step prediction error covariance matrix from moment $k$ to moment $k+1$, $H^T(k+1)$ represents the prediction output matrix at moment $k+1$, $P(k|k)$ represents a prediction error covariance matrix at moment $k$, $A^T(k+1,k)$ represents the state transition matrix from moment $k$ to moment $k+1$, an additional T represents transposition, $P(k+1|k)$ represents the single-step prediction error covariance matrix from moment $k$ to moment $k+1$, $P(k+1|k+1)$ is the prediction error covariance matrix at moment $k+1$, $Q(k)$ is a covariance matrix in relation with $w(k)$ and is obtained by calculating the residual white noise sequence in Equation (1), and I is an identity matrix;

the phase deconvolution algorithm is integral, that is, an error compensation value accumulated by convolutional phase unwrapping always exists in subsequent phase deconvolution results, and the observation vector $Z(k+1)$ has to be corrected after the error compensation phase is corrected, i.e., by adding an accumulation amount $C(k+1)$ to eliminate the influence of the accumulation of the error compensation of the phase deconvolution algorithm on the accuracy of the subsequent predicted phase value.

In step 4 of the above technical solution, the demodulated phase at moment $k+1$ is predicted according to historical statistical information and the demodulated phase at moment $k$ through the established Kalman prediction model for the demodulated phase, that is, $\varphi(k+1) = [1\ 0\ \ldots\ 0]\cdot\hat{\Phi}(k+1|k+1)$, the predicted phase value is subtracted from the actual demodulated phase value to judge whether the jump point exists in the actual demodulated phase, the polarization state of light should be determined if the jump point exists, and the jump point should be corrected when the polarization state of the light is determined to be depolarized by replacing the actual demodulated phase value with the predicted phase value.

In step 1 of the above technical solution, the demodulated phase in the case of non-depolarization is selected as the historical sample data $\{\varphi(k)\}$;

$$I_n = A_n + B_n \cos(\varphi + (n-1)\cdot 2\pi/3)\ n=1,2,3$$

where $I_n$ ($n=1, 2, 3$) is the light intensity values output by three terminals of the 3×3 coupler detected by the photoelectric detector of the Mach Zender interferometer, $A_n$ is a direct current component, $B_n$ is an alternating current component, and $\varphi$ is a phase value to be demodulated; when the polarization states of two beams of interference light are close to orthogonal, the alternating current component $B_n$ of the light intensity output by three terminals of the 3×3 coupler approaches to zero, as a result, the light intensity values output by three terminals of the 3×3 coupler has a relationship $I_1 \approx I_2 \approx I_3$; therefore, the polarization states of the two beams of interference light can be judged through the light intensity values output by three terminals of the 3×3 coupler, and the demodulated phase in the case of non-depolarization is thus selected as the historical sample data $\{\varphi(k)\}$.

In step 2 of the above technical solution, determining the orders of the autoregressive moving average model for the demodulated phase through Akaike Information Criterion or Bayesian Information Criterion comprises specifically:

determining the orders of the autoregressive moving average model for the demodulated phase to be ARMA (p, q) through Akaike Information Criterion, where p and q satisfy the following relational equation;

$$\min \text{AIC} = n \ln \hat{\sigma}_\varepsilon^2 + 2(p+q+1)$$

determining the orders of the autoregressive moving average model for the demodulated phase to be ARMA (p, q) through Bayesian information criterion, where p and q satisfy the following relational equation;

$$\min \text{BIC} = \ln(n)\cdot(p+q+1) - 2\ln \hat{\sigma}_\varepsilon^2$$

where min AIC is a most appropriate order of the autoregressive moving average model for the demodulated phase through Akaike Information Criterion, min BIC is a most appropriate order of the autoregressive moving average model for the demodulated phase through Bayesian Information Criterion, n is the number of the demodulated phase $\varphi(k)$ selected as the sample, and $\hat{\sigma}_\varepsilon^2$ is an estimation of the white noise variance of the model.

The parameters $a_n(n=1, 2, \ldots, p)$, $\theta_m(m=1, 2, \ldots, q)$ of the autoregressive moving average model for the demodulated phase are determined through the historical demodulated phase sample sequence $\{\varphi(k)\}$ in conjunction with the least-square estimation, so that the specific form of the autoregressive moving average model for the demodulated phase is determined.

In step 2, establishing the ARMA model with the selected historical demodulated phase sample sequence requires that the selected sample sequence $\{\varphi(k)\}$ is a stable sequence, therefore, firstly, the stability of $\{\varphi(k)\}$ is tested through a graph test method. If the sequence meets the requirement of stability, the ARMA model is established directly with the sample sequence $\{\varphi(k)\}$, and if not, subtraction is performed on the sample sequence $\{\varphi(k)\}$ until the requirement of stability is met, and then the ARMA model is established with the stable sequence after subtractions.

In step 4 of the above technical solution, the real-time prediction is performed on the demodulated phase with the established Kalman prediction model for the demodulated phase, the predicted phase is subtracted from the actual phase demodulated with the arctangent algorithm and the phase deconvolution algorithm to judge whether the jump point exists in the actual demodulated phase, and if an absolute value of a difference from the subtraction is greater than a threshold value, then the jump point exists. The selection of the threshold value is based on the noise level of the demodulation system and is set to be the variance of the demodulated phase without vibration signals over a past period. The depolarization state is judged by the light intensity signals output by three terminals of the 3×3 optical fiber coupler collected by a data acquisition card, specifically, three groups of differences are obtained by subjecting three paths of light intensity signals to subtractions, and if the three groups of differences are smaller than a set threshold value, the depolarization state is determined.

The method for judging the depolarization state in step 4 is to analyze the light intensity signals $I_1$, $I_2$, $I_3$ output by the 3×3 coupler obtained by the system.

Further, let $S_1=|I_1-I_2|$, $S_2=|I_2-I_3|$, $S_1=|I_1-I_3|$.

When $[(S_1<N)\cap(S_2<N)\cap(S_3<N)]=TRUE$, the polarization states of the two beams of light subjected to interference in the current light path are close to orthogonal, and the equation is not true otherwise. In the equation, N represents an estimation of the noise level for intensity data output by the 3×3 coupler collected by the data acquisition card.

The actual demodulated phase $\Phi$ R(k+1) is corrected according to the judgment of the existence of the jump point and the judgment of the polarization state, and the actual demodulated phase is replaced with the predicted phase.

The error compensation accumulated by convolutional phase unwrapping in the phase deconvolution algorithm always exists in the subsequent phase deconvolution results. To ensure a correct subsequent predicted phase of the Kalman prediction model for the demodulated phase, the correction C(k+1) to the measurement state vector should be a cumulative result of the phase corrections, i.e., C(k+1)=C(k)+M(k), where M(k) is a difference between the predicted phase value and the actual demodulated phase value.

The disclosure solves the problem of random step jump of the demodulated phase caused by polarization-induced fading in the optical fiber vibration demodulation system and ensures the correctness of subsequent analyses based on vibration data.

What has not been described in detail in this specification is the prior art known to those skilled in the art.

What is claimed is:

1. A method for correcting a phase jump caused by polarization-induced fading in optical fiber phase demodulation, comprising steps of:
    step 1: analyzing optical signals output by three terminals of a 3×3 optical fiber coupler in a Mach Zender interferometer, and selecting a demodulated phase in a case of non-depolarization as historical sample data;
    step 2: using a historical sample sequence selected in step 1, building an autoregressive moving average model for the demodulated phase through time sequence analyses, determining orders of the autoregressive moving average model for the demodulated phase through Akaike Information Criterion or Bayesian Information Criterion, and determining an autoregressive coefficient and a moving average coefficient of the autoregressive moving average model for the demodulated phase through a least-square estimation;
    step 3: representing a Kalman state vector with the demodulated phase, initializing parameters such as a Kalman state transition matrix, a system noise vector, and a prediction output matrix with the autoregressive moving average model for the demodulated phase obtained in step 2, establishing a Kalman prediction model for the demodulated phase, and deriving recursive equations for the Kalman prediction model for the demodulated phase;
    step 4: performing real-time prediction on the demodulated phase with the Kalman prediction model for the demodulated phase, subtracting a predicted phase from an actual phase demodulated with an arctangent algorithm and a phase deconvolution algorithm to judge whether a jump point exists in an actual demodulated phase, determining a polarization state of light if the jump point exists, and correcting the jump point when the polarization state of the light is determined to be depolarized by replacing an actual demodulated phase value with a predicted phase value.

2. The method for correcting a phase jump caused by polarization-induced fading in optical fiber phase demodulation according to claim 1, wherein: in step 1, in a case of non-depolarization, a phase difference of 120° exists in the optical signals output by three terminals of a 3×3 optical fiber coupler, a photoelectric detector detects that the optical signals output by three terminals of the 3×3 optical fiber coupler do not tend to be equal, and the demodulated phase in the case of non-depolarization is selected as the historical sample data $\{\varphi(k)\}$ through a judgment of an amplitude of the optical signals output by three terminals of the 3×3 optical fiber coupler.

3. The method for correcting a phase jump caused by polarization-induced fading in optical fiber phase demodulation according to claim 1, wherein: in step 2, the autoregressive moving average model for the demodulated phase is built through the historical sample data $\{\varphi(k)\}$, and the demodulated phase at a current moment of the autoregressive moving average model for the demodulated phase and the demodulated phase at a historical moment satisfy a following relational equation:

$$\varphi(k+1)=a_1\varphi(k)+a_2\varphi(k-1)+\ldots+a_p\varphi(k-p+1)$$

$$e(k+1)+\theta_1 e(k)+\ldots+\theta_q e(k-q+1) \qquad (1)$$

where $\varphi(k+1)$, $\varphi(k)$, $\varphi(k-1)$, ..., $\varphi(k-q+1)$ represent demodulated phase values at moments k+1, k, k−1 ..., k−p+1, respectively; e(k+1), e(k), ..., e(k−q+1) is a white noise residual error sequence, representing a residual error between the current moment and the historical moment, $a_n$(n=1, 2, ..., p) is an autoregressive coefficient, p is a regression order, $\theta_m$(m=1, 2, ..., q) is a moving average coefficient, and q is a moving average order;

the orders p and q of the autoregressive moving average model for the demodulated phase are determined through Akaike Information Criterion or Bayes Information Criterion, and the autoregressive coefficient $a_n$ and the moving average coefficient $\theta_m$ of the autoregressive moving average model for the demodulated phase are determined through a selected historical sample sequence {φ(k)} of the demodulated phase in conjunction with a least-square estimation, so that a specific form of the autoregressive moving average model for the demodulated phase is determined.

4. The method for correcting a phase jump caused by polarization-induced fading in optical fiber phase demodulation according to claim 3, wherein: in step 2, determining the orders of the autoregressive moving average model for the demodulated phase through Akaike Information Criterion or Bayesian Information Criterion comprises specifically:

determining the orders of the autoregressive moving average model for the demodulated phase to be ARMA (p, q) through Akaike Information Criterion, where p and q satisfy a following relational equation;

$$\min AIC = n \ln \hat{\sigma}_\varepsilon^2 + 2(p+q+1)$$

determining the orders of the autoregressive moving average model for the demodulated phase to be ARMA (p, q) through Bayesian information criterion, where p and q satisfy a following relational equation;

$$\min BIC = \ln(n) \cdot (p+q+1) - 2 \ln \hat{\sigma}_\varepsilon^2$$

where min AIC is a most appropriate order of the autoregressive moving average model for the demodulated phase through Akaike Information Criterion, min BIC is a most appropriate order of the autoregressive moving average model for the demodulated phase through Bayesian Information Criterion, n is a number of the demodulated phase φ(k) selected as a sample, and $\hat{\sigma}_\varepsilon^2$ is an estimation of white noise variance of the autoregressive moving average model.

5. The method for correcting a phase jump caused by polarization-induced fading in optical fiber phase demodulation according to claim 4, wherein: parameters $a_n$(n=1, 2, ..., p), $\theta_m$(m=1, 2, ..., q) of the autoregressive moving average model for the demodulated phase are determined through the historical demodulated phase sample sequence {φ(k)} in conjunction with the least-square estimation, so that the specific form of the autoregressive moving average model for the demodulated phase is determined.

6. The method for correcting a phase jump caused by polarization-induced fading in optical fiber phase demodulation according to claim 1, wherein: the Kalman prediction model for the demodulated phase established in step 3 is expressed as:

$$\begin{cases} \Phi(k+1) = A(k+1,k)\Phi(k) + w(k) \\ Z(k+1) = H(k+1)\Phi(k+1) + v(k+1) \end{cases} \quad (2)$$

where Φ(k) is a state vector at moment k, Φ(k+1) is a state vector at moment k+1, Z(k+1) is a measurement vector at moment k+1, w(k) is a system noise vector at moment k, v(k+1) is a measurement noise vector at moment k+1, A(k+1, k) is a state transition matrix from moment k to moment k+1, and H(k+1) is a prediction output matrix at moment k+1;

the Kalman state vector Φ(k) represented by the demodulated phase φ(k) is as follows:

Let:

$$\Phi(k) = [\Phi_1(k) \varphi_2(k) \ldots \varphi_p(k)]^T \quad (3)$$

where Φ(k) represents the Kalman state vector built by the demodulated phase, and T represents transposition of a matrix;

the autoregressive moving average model for the demodulated phase is further introduced into the Kalman prediction model for the demodulated phase to obtain a state equation of the Kalman prediction model for the demodulated phase, which is as follows:

Let: $e_1(k)=e(k), e_2(k)=e(k-1), \ldots, e_{q+1}(k)=e(k-q+1)$ $$\Phi(k+1) = \begin{bmatrix} a_1 & a_2 & \cdots & a_{p-1} & a_p \\ 1 & 0 & \cdots & 0 & 0 \\ 0 & 1 & \cdots & 0 & 0 \\ \vdots & \vdots & \ddots & \vdots & 0 \\ 0 & 0 & \cdots & 1 & 0 \end{bmatrix} \quad (4)$$

$$\Phi(k) + \begin{bmatrix} 1 \\ 0 \\ 0 \\ \vdots \\ 0 \end{bmatrix} e(k+1) + \begin{bmatrix} -\theta_1 \\ 0 \\ 0 \\ \vdots \\ 0 \end{bmatrix} e_1(k) + \begin{bmatrix} -\theta_2 \\ 0 \\ 0 \\ \vdots \\ 0 \end{bmatrix} e_2(k) +$$

$$\cdots + \begin{bmatrix} -\theta_q \\ 0 \\ 0 \\ \vdots \\ 0 \end{bmatrix} e_{q+1}(k)$$

where Φ(k+1), Φ(k) are phase state vectors at moments k+1, k, e(k+1), e(k), e(k-1), ..., e(k-q+1) is a residual white noise sequence of an autoregressive moving average sequence for the demodulated phase, and $\theta_1$, $\theta_2$ ..., $\theta_q$ are moving average coefficients;

an observation equation of the Kalman prediction model for the demodulated phase is obtained as follows:

$$Z(k+1) = [1\ 0\ \ldots\ 0]\Phi(k+1) \quad (5)$$

specific forms of the state transition matrix A(k+1, k) and the prediction output matrix H(k+1) are determined by comparing Equation (2) with Equations (4) and (5), and recursive equations for the Kalman prediction model for the demodulated phase are further derived through the state equation (4) and the observation equation (5) of the Kalman prediction model for the demodulated phase, as follows:

$$\hat{\Phi}(k+1|k+1) = A(k+1,k)\Phi(k|k) + K(k+1)[Z(k+1) - H(k+1)A(k+1,k)\Phi(k|k)] \quad (6)$$

$$K(k+1) = P(k+1|k)H^T(k+1) \cdot [H(k+1)P(k+1|k)H^T(k+1)]^{-1} \quad (7)$$

$$P(k+1|k) = A(k+1,k)P(k|k)A^T(k+1,k) + Q(k) \quad (8)$$

$$P(k+1|k+1) = [I - K(k+1)H(k+1)]P(k+1|k) \quad (9)$$

where $\hat{\Phi}(k+1|k+1)$ represents an estimated value of the state vector Φ(k+1) at moment k+1; K(k+1) is a Kalman gain matrix at moment k+1, Φ(k|k) represents an estimate of the state vector at moment k, Z(k+1) represents an observation vector in Equation (5), P(k+1|k) represents a single-step prediction error covariance matrix from moment k to moment k+1, $H^T(k+1)$ represents the prediction output matrix at moment k+1, P(k|k) represents a prediction error covariance matrix at moment k, $A^T(k+1,k)$ represents the state transition matrix from moment k to moment k+1, an additional T represents transposition, P(k+1|k) represents the single-step prediction error covariance matrix from moment k to moment k+1, P(k+1|k+1) is the prediction error covariance matrix at moment k+1, Q(k) is a covariance matrix in relation with w(k) and is obtained by calculating the residual white noise sequence in Equation (1), and I is an identity matrix;

the phase deconvolution algorithm is integral, that is, an error compensation value accumulated by convolutional phase unwrapping always exists in subsequent phase deconvolution results, and the observation vector Z(k+1) has to be corrected after an error compensation phase is corrected, i.e., by adding an accumulation amount C(k+1) to eliminate influence of the accumulation of the error compensation of the phase deconvolution algorithm on accuracy of a subsequent predicted phase value.

7. The method for correcting a phase jump caused by polarization-induced fading in optical fiber phase demodulation according to claim 1, wherein: in step 4, the demodulated phase at moment k+1 is predicted according to historical statistical information and the demodulated phase at moment k through the established Kalman prediction model for the demodulated phase, that is, $\varphi(k+1)=[1\ 0\ \ldots\ 0]\cdot\Phi(k+1|k+1)$, the predicted phase value is subtracted from the actual demodulated phase value to judge whether the jump point exists in the actual demodulated phase, the polarization state of light should be determined if the jump point exists, and the jump point should be corrected when the polarization state of the light is determined to be depolarized by replacing the actual demodulated phase value with the predicted phase value.

8. The method for correcting a phase jump caused by polarization-induced fading in optical fiber phase demodulation according to claim 1, wherein: in step 1, the demodulated phase in the case of non-depolarization is selected as the historical sample data $\{\varphi(k)\}$;

$$I_n = A_n + B_n \cos(\varphi + (n-1)\cdot 2\pi/3) \quad n=1,2,3$$

where $I_n$ (n=1, 2, 3) is light intensity values output by three terminals of a 3×3 coupler detected by the photoelectric detector of the Mach Zender interferometer, $A_n$ is a direct current component, $B_n$ is an alternating current component, and $\varphi$ is a phase value to be demodulated; when polarization states of two beams of interference light are close to orthogonal, the alternating current component $B_n$ of the light intensity output by three terminals of the 3×3 coupler approaches to zero, as a result, the light intensity values output by three terminals of the 3×3 coupler has a relationship $I_1 \approx I_2 \approx I_3$; therefore, the polarization states of the two beams of interference light can be judged through the light intensity values output by three terminals of the 3×3 coupler, and the demodulated phase in the case of non-depolarization is thus selected as the historical sample data $\{\varphi(k)\}$.

9. The method for correcting a phase jump caused by polarization-induced fading in optical fiber phase demodulation according to claim 1, wherein: in step 4, the real-time prediction is performed on the demodulated phase with the Kalman prediction model for the demodulated phase, the predicted phase is subtracted from the actual phase demodulated with the arctangent algorithm and the phase deconvolution algorithm to judge whether the jump point exists in the actual demodulated phase, and if an absolute value of a difference from a subtraction is greater than a threshold value, then the jump point exists.

* * * * *